(12) United States Patent
Harasawa

(10) Patent No.: US 7,070,452 B2
(45) Date of Patent: *Jul. 4, 2006

(54) MEMORY CARD CONNECTOR

(75) Inventor: Masaaki Harasawa, Kanagawa (JP)

(73) Assignee: J.S.T. Mfg. Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/921,338

(22) Filed: Aug. 19, 2004

(65) Prior Publication Data

US 2005/0101174 A1    May 12, 2005

(30) Foreign Application Priority Data

Aug. 20, 2003    (JP) ............................ 2003-296730

(51) Int. Cl.
*H01R 24/00*    (2006.01)
(52) U.S. Cl. ..................................... 439/630
(58) Field of Classification Search ............... 439/630, 439/946, 159, 152, 337
See application file for complete search history.

(56) References Cited

U.S. PATENT DOCUMENTS

| | | | |
|---|---|---|---|
| 6,648,694 B1 * | 11/2003 | Takamori et al. | 439/630 |
| 6,719,589 B1 * | 4/2004 | Nishio et al. | 439/630 |
| 6,776,640 B1 * | 8/2004 | Nishioka | 439/325 |

FOREIGN PATENT DOCUMENTS

| | | |
|---|---|---|
| EP | 1 293 929 A1 | 3/2003 |
| JP | 08-096089 | 4/1996 |
| JP | 09-171852 | 6/1997 |
| JP | 2001-291552 | 10/2001 |
| JP | 2002-015820 | 1/2002 |
| JP | 2002-110297 | 4/2002 |
| JP | 2002-124343 | 4/2002 |
| JP | 2002-150226 | 5/2002 |
| JP | 2003-006576 | 1/2003 |
| JP | 2003-086293 | 3/2003 |
| JP | 2003-086296 | 3/2003 |
| JP | 2003086289 A * | 3/2003 |
| JP | 2003092167 A * | 3/2003 |
| JP | 2003-187904 | 7/2003 |

(Continued)

OTHER PUBLICATIONS

Masaaki Harasawa, Memory Card Connector, U.S. Appl. No. 10/921,272.*
EP Search Report, Dec. 16, 2004.

*Primary Examiner*—Tho D. Ta
*Assistant Examiner*—Vanessa Girardi
(74) *Attorney, Agent, or Firm*—Rader, Fishman & Grauer PLLC (57) ABSTRACT

A connector has a housing, a cover for covering the housing. The housing has, a card retention section, a plurality of contacts, a swing slider, and a lock mechanism. The card retention section has a card insertion port for accepting therein a memory card. The contacts face the card insertion port to electrically contact with a distal end side of the memory card. The swing slider is provided to freely swing to an insertion direction of the memory card, and engages with the distal end and a concave section on a side of the memory card to slide with the memory card in an insertion direction, when the memory card is inserted into the card insertion port of the card retention section. The lock mechanism for swinging the swing slider toward inside to retain the memory card when the memory card reaches a proximal end side of the housing.

5 Claims, 12 Drawing Sheets

FOREIGN PATENT DOCUMENTS

| | | | | | |
|---|---|---|---|---|---|
| JP | 2003-217713 | 7/2003 | WO | WO 02/07269 A2 | 1/2002 |

* cited by examiner

MEMORY CARD CONNECTOR

CROSS-REFERENCE TO RELATED APPLICATIONS

This application is based upon and claims the benefit of priority from the prior Japanese Patent Application No. 2003-296730 filed on Aug. 20, 2003, the entire contents of which is incorporated herein by reference.

FIELD OF THE INVENTION

The present invention relates to a memory card connector for establishing an electrical connection with a memory card exemplified by a miniSD (Secure Digital) card based on the SDA (Standard Card Association) standard through insertion thereof and, more specifically, to a memory card connector with a lock mechanism for retaining a memory card at its inserted position.

BACKGROUND OF THE INVENTION

A memory card serving as a card storage unit includes flash memory for a storage medium. The memory card is very small in size, and thus consumes very little electricity for data reading and writing. With such advantages, the memory card has been popular especially as recording medium typically for camera-equipped mobile phones and PDAs (Personal Digital Assistances).

Compared with disk storage units exemplified by flexible disks (FDs) and magneto-optic disks (MOs), the memory cards are smaller in storage capacity and higher in price. With the recent technological progress and economies of scale in manufacturing observed for devices using memory cards, however, the storage capacity of the memory cards is increased up to about 128 MB, and the price thereof is reduced.

Moreover, unlike FDs and MOs, the memory cards require no drive for data reading and writing. With such an advantage, the memory cards are considered preferable as storage media for digital cameras, notebook PCs, and portable music players those placing prime importance on power-thriftiness and portability.

The miniSD card has the outer dimensions of 21.55 mm (length)×20 mm (width)×1.4 mm (thickness). On the other hand, the SD card has the outer dimensions of 32.2 mm (length)×24 mm (width)×2.1 mm (thickness). As such, compared with the SD card, the miniSD card is reduced in capacity about 60%. Another difference of the miniSD card from the SD card is the number of connector terminals provided on the surface, i.e., 11 pins for the miniSD card and 9 pins for the SD card.

For data reading and writing from/to such a memory card, a memory card connector has appeared in the market to serve as a connector for the purpose. The memory card connector is provided with a lock mechanism to prevent a memory card inserted into a housing from being detached or pulled out. As an example, refer to JP-A-2003-86296.

The above memory card connector includes the housing, a shield plate which is attached as to cover the housing upper surface and both side surfaces, the lock mechanism for locking the inserted memory card, and a connector pin retention section formed in one piece with the housing. The lock mechanism includes a lock member which is provided for engaging with the memory card inserted into a memory card insertion section to lock the memory card at its predetermined insertion position, a slider for supporting the lock member, an ejection coil spring for biasing the slider in the pull-out direction, and a lock pin which is provided for engaging with a heart cam formed to the slider to latch the slider at its attachment position.

The problem with such a conventional memory card connector is that when the coil spring is increased in compressive strength to pull out the memory card against the friction force between the memory card and a plurality of connector pins (contact terminals) which is making contact with terminals of the memory card, the memory card might pop out from the memory card connector.

SUMMARY OF THE INVENTION

To solve such problems, an object of the present invention is to provide a memory card connector capable of preventing a memory card from popping out therefrom.

To achieve such an object, the inventor accordingly invented a new connector as below.

A first aspect of the present invention is directed to A connector comprising, a housing, a cover for covering the housing, and wherein the housing includes, a card retention section of substantially a box shape having a card insertion port for accepting therein a memory card, a plurality of contacts which faces the card insertion port to electrically contact with a distal end side of the memory card, a swing slider which is provided to freely swing in a direction substantially orthogonal to an insertion direction of the memory card, and engages with the distal end and a concave section on a side of the memory card to slide with the memory card in an insertion direction when once the memory card is inserted into the card insertion port of the card retention section, and a lock mechanism for swinging the swing slider toward inside to retain the memory card when the memory card reaches a proximal end side of the housing.

According to a second aspect of the present invention, the connector according to the first aspect of the present invention, wherein the swing slider has a cam channel of a heart shape, wherein the lock mechanism includes a biasing member for biasing the swing slider toward inside of the card retention section and a guide rod engaged with the cam channel of the swing slider, and whereby the guide rod moves along the cam channel, and the swing slider is pulled by the biasing member and moves toward the card insertion port while engaging with the concave section and the distal end of the memory card when the memory card in a retained state is pushed in the insertion direction.

According to a third aspect of the present invention, the connector according to first or second aspect of the present invention, wherein the swing slider is provided with a first lug to be latched at the distal end of the memory card, and a second lug for engaging with the concave section of the memory card.

According to a fourth aspect of the present invention, the connector according to second or third aspect of the present invention, wherein a bottom surface of the cam channel is changed in level to prevent the guide rod from moving in a reverse direction, and wherein the cover includes a pressing piece for biasing the guide rod to the bottom surface of the cam channel.

According to a fifth aspect of the present invention, the connector according to any one of first to fourth aspect of the present invention, wherein the memory card is a mini SD card.

The memory card is formed by housing a memory chip in a card-shaped case. The memory card is provided with a storage unit including connector terminals on one side thereof. The memory card includes a miniSD card, an SD card, or a memory stick card.

The housing may be formed by an insulative synthetic resin material. The cover is preferably formed by a metal plate in contemplation of shielding the memory card.

The contact is a leaf spring contact, and can be a cantilever.

According to the present invention, when a memory card is inserted into the connector, the second lug abuts the side surface of the memory card. When the memory card is pushed further, the second lug slides in contact along the side surface of the memory card, then the second lug is engaged with the concave section thereof. At the same time, the first lug is engaged with the distal end of the memory card. Then, when the memory card is pushed still further, the swing slider moves toward the proximal end of the housing together with the memory card. Then, the guide rod moves in the heart cam channel so that the swing slider moves inward against the biasing member. Thereafter, one end of the guide rod is latched by the heart cam channel, and thus the swing slider retains the memory card.

When the memory card in the retained state is pushed in the insertion direction, the guide rod moves along the cam channel, and as a result, the swing slider moves toward the outside. In response thereto, the first lug also moves toward the outside so that the memory card is released and thus is not retained any more. Thereafter, the swing slider is pulled by the biasing member, and moves toward the card insertion port while engaging with the concave section and the distal end of the memory card.

With such a structure, during when the memory card is moving toward the card insertion port, the second lug remains engaged with the concave section of the memory card. Accordingly, the memory card is not accidentally popped out from the connector.

DETAILED DESCRIPTION OF THE PREFERRED EMBODIMENT

In the below, the most preferred embodiment of the present invention is described by referring to the accompanying drawings.

Figure 1:
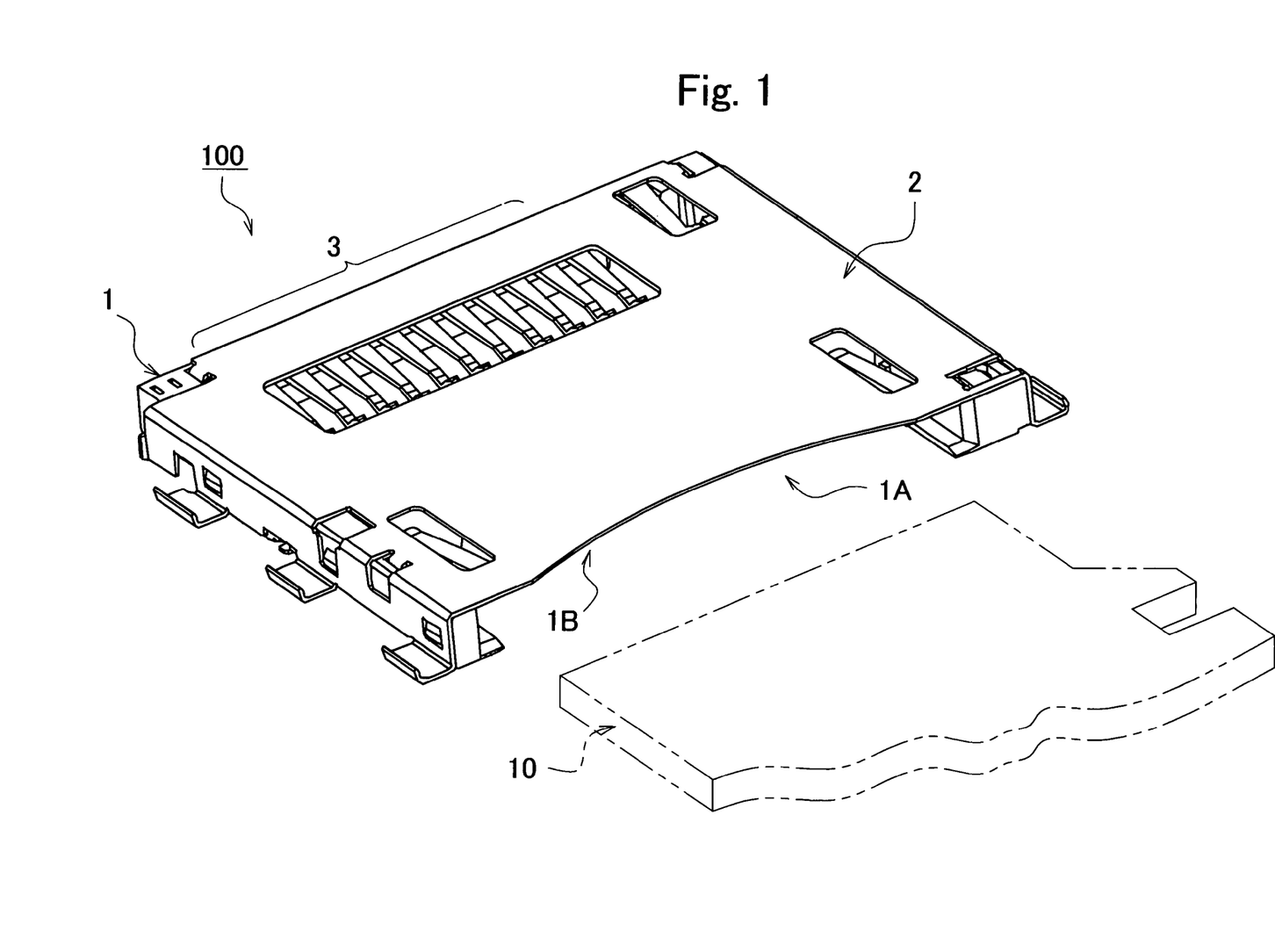
FIG. 1 is a perspective external view of an exemplary memory card connector of the present invention.

FIG. 1 is a perspective external view of an exemplary memory card connector (hereinafter, simply referred to as connector) of the present invention. In FIG. 1, a connector 100 is provided with a housing 1, and a cover 2 covering the housing 1.

In FIG. 1, the housing 1 is formed rectangular using an insulative synthetic resin material. The cover 2 is made from a metal plate, and both blades thereof are bent into L-shape. The cover 2 is so attached as to cover the housing 1.

Through attachment of the cover 2 to the housing 1, the connector 100 is formed with a card insertion section 1A, and a thin card retention section 1B of a rectangular parallelepiped, wherein the card insertion section 1A accepts a memory card 10 inserted thereinto. A plurality of cantilever contact 3 is provided, and arranged to the housing 1 at positions where opposed to the card insertion section 1A. With this structure, the cantilever contacts 3 are to be electrically contacted with connector terminals (not shown) on the surface of the memory card 10.

Figure 2:
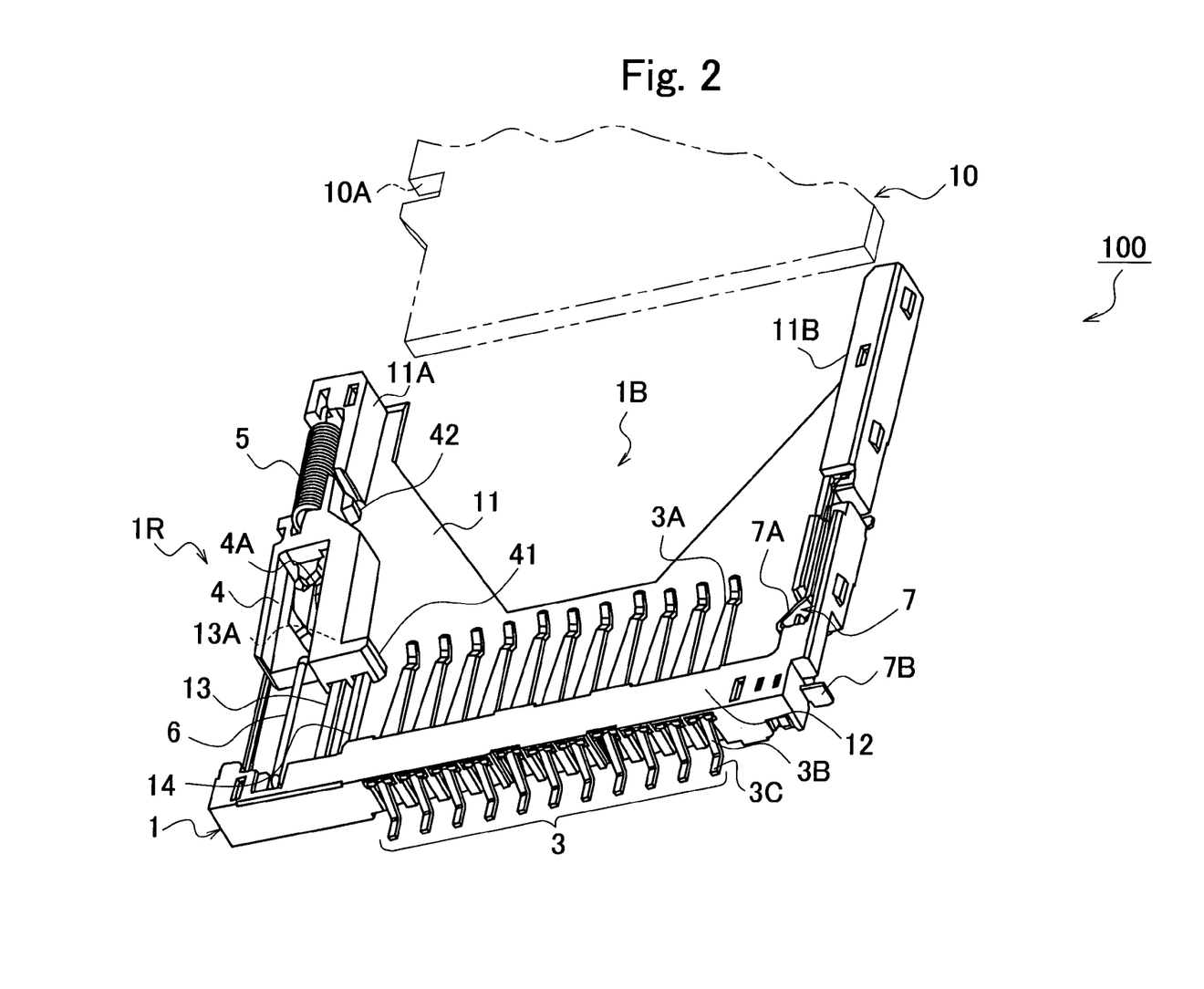
FIG. 2 is a perspective external view of a connector 100 of the present invention with its cover removed.

FIG. 2 is a perspective external view of the connector 100 with the cover 2 of FIG. 1 removed. As shown in FIG. 2, a top-open concave section 11 serving as a card retention section includes guide walls 11A and 11B opposing to each other with a space therebetween slightly wider than the width of the memory card 10. These guide walls 11A and 11B restrict the width of the memory card 10, thereby allowing positioning the connector terminals on the memory card 10 and the cantilever contacts 3.

As shown in FIG. 2, the cantilever contacts 3 are each a leaf spring contact, and can be a cantilever. These cantilever contacts 3 are arranged in the direction orthogonal to the insertion direction of the memory card 10.

The cantilever contacts 3 are placed on the side of a stop wall 12 locating closer to the tail ends of the connector terminals arranged on the memory card 10. Specifically, elastic sections 3A of the cantilever contacts 3 are opposed to the card insertion port 1A (refer to FIG. 1), and each of fixation sections 3B of the cantilever contacts 3 form a junction tab 3C by their ends extending rearward of the stop wall 12 for soldering joint.

As shown in FIG. 2, a lock mechanism 1R of the connector 100 includes a swing slider 4, which is placed on one planar side of the top-open concave section 11. The swing slider 4 is biased by a tensile coil spring 5 as a biasing member toward the opposite direction from the insertion direction of the memory card 10.

On the planar side of the top-open concave section 11, a first guide 13 of a square column extends from the side of the stop wall 12 of the housing 1 toward the side of the card insertion port 1A (refer to FIG. 1). At the tail end of the first guide 13, a cylindrical protrusion 13A is formed.

Moreover, the planar side of the top-open concave section 11 is formed with a second guide 14 of a square column to be parallel with the first guide 13. Compared with the first guide 13, the second guide 14 is placed closer toward the center of the top-open concave section 11.

Moreover, referring to FIG. 2, the swing slider 4 is formed thereon with a cam channel 4A of a heart shape. This heart cam channel 4A is coupled to one end of the guide rod 6. The other end of the guide rod 6 is retained on the side of the stop wall 12 to freely rotate. The swing slider 4 and the guide rod 6 follow the trail of the heart cam channel 4A for relative displacement.

The swing slider 4 includes a first lug 41 which abuts the corner part of the memory card 10 on the insertion side. The swing slider 4 also includes a second lug 42 that is to be latched with the concave section 10A formed on the side surface of the memory card 10. The second lug 42 protrudes from the top-open concave section 11 to abut the side surface of the memory card 10 when the memory card 10 is inserted into the card retention section 1B.

On the side of the guide wall 11B of FIG. 2, a card detection switch 7 is provided to electrically detect whether the memory card 10 is correctly placed at its insertion position. The card detection switch 7 is formed by a movable plate 7A and a fixed plate 7B.

As shown in FIG. 2, the movable plate 7A is partially bent, and the bending section is extended from the side of the guide wall 11B. When the memory card 10 is correctly placed at its insertion position, the bending section of the movable plate 7A is pushed toward the side surface part of the memory card 10, and thus the tail end thereof abuts the fixed plate 7B. That is, the movable plate 7A and the fixed plate 7B are electrically connected to each other.

Once the memory card 10 is ejected from the connector 100, the bending section of the movable plate 7A returns to its original position so that the electrical connection established between the movable plate 7A and the fixed plate 7B is cut off. Herein, the tail ends of the movable plate 7A and the fixed plate 7B are connected to a card detection circuit of a printed circuit onto which the connector 100 is incorporated.

Figure 3:
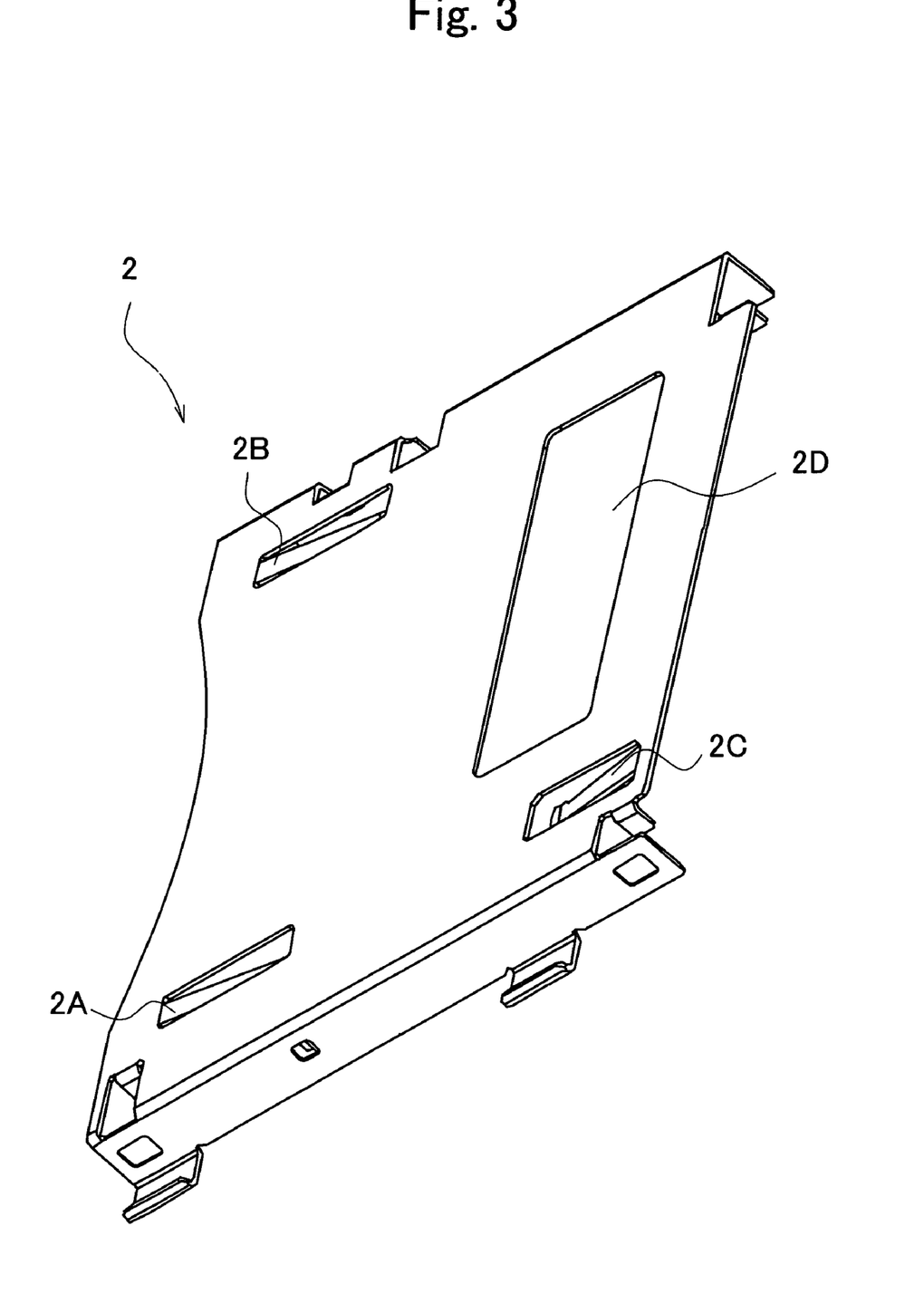
FIG. 3 is a perspective external view of the cover of the present invention.

FIG. 3 is a perspective external view of the cover 2. By referring to FIG. 3, a pair of pressing pieces 2A and 2B are formed on the upper surface of the cover 2 with such a certain space therebetween as not to erase any printed letters or others on the memory card 10. These pressing pieces 2A and 2B press the memory card 10 of FIG. 2 toward the top-open concave section 11.

By referring to FIG. 3, another pressing piece 2C is formed to the rear part of the upper surface of the cover 2. This pressing piece 2C is provided for pressing the guide rod 6 of FIG. 2 toward the bottom surface of the heart cam channel 4A. Also to the rear part of the upper surface of the cover 2, a window 2D is provided to check the cantilever contacts 3 of FIG. 2, i.e., their contact state.

Figure 4:
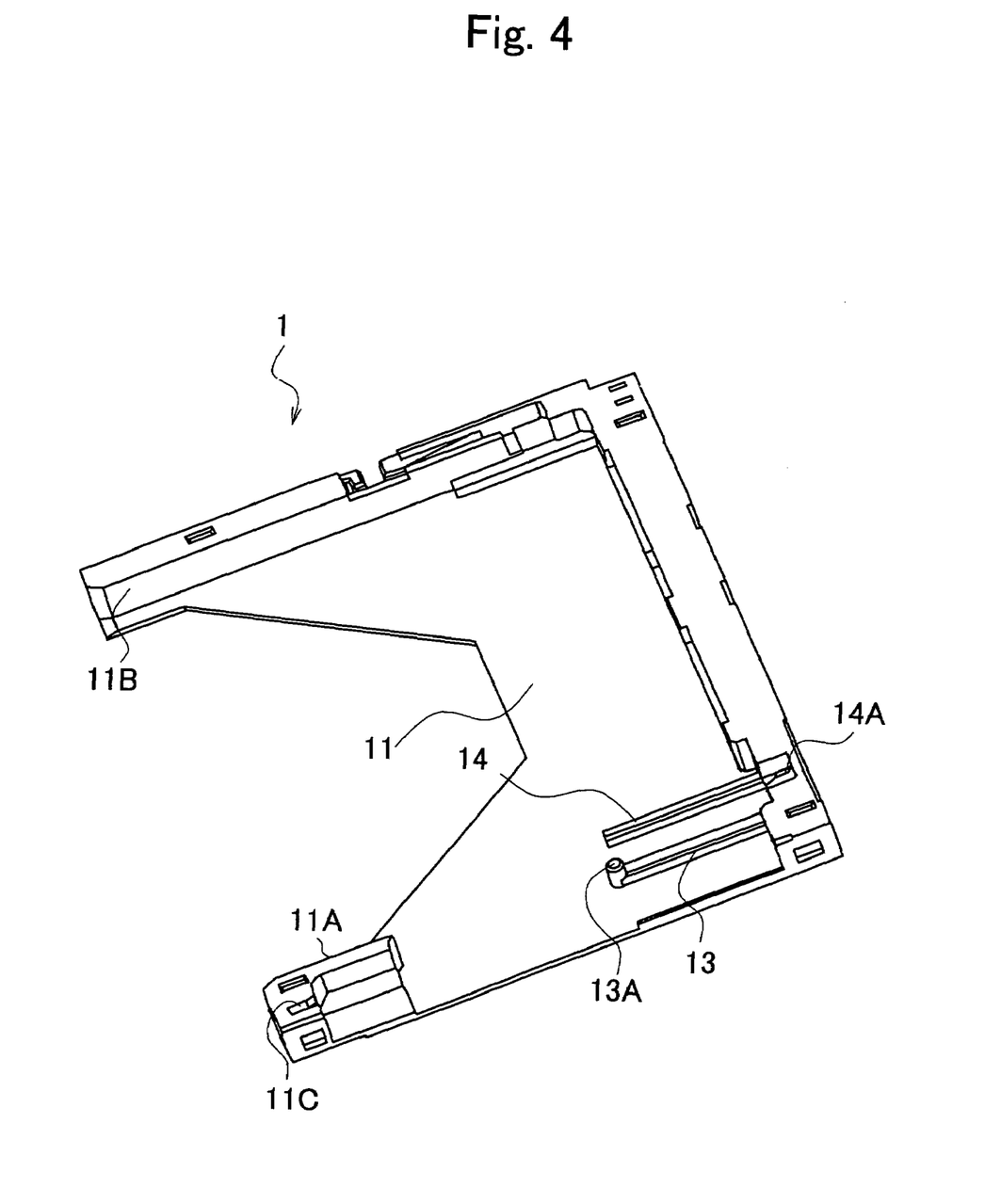
FIG. 4 is a perspective external view of a housing of the present invention.

FIG. 4 is a perspective external view of the housing 1. As shown in FIG. 4, the first guide 13 and the second guide 14 are both protruding from the bottom surface of the top-open concave section 11 so as to be one piece with the housing 1.

At the rear end of the second guide 14, a shaft hole 14A is drilled to couple, through rotation, with the end part of the guide rod 6 of FIG. 2. To the side of the guide wall 11A, formed is a stepped groove 11C for latching the hook of the tensile coil spring 5 of FIG. 2.

Figure 5:
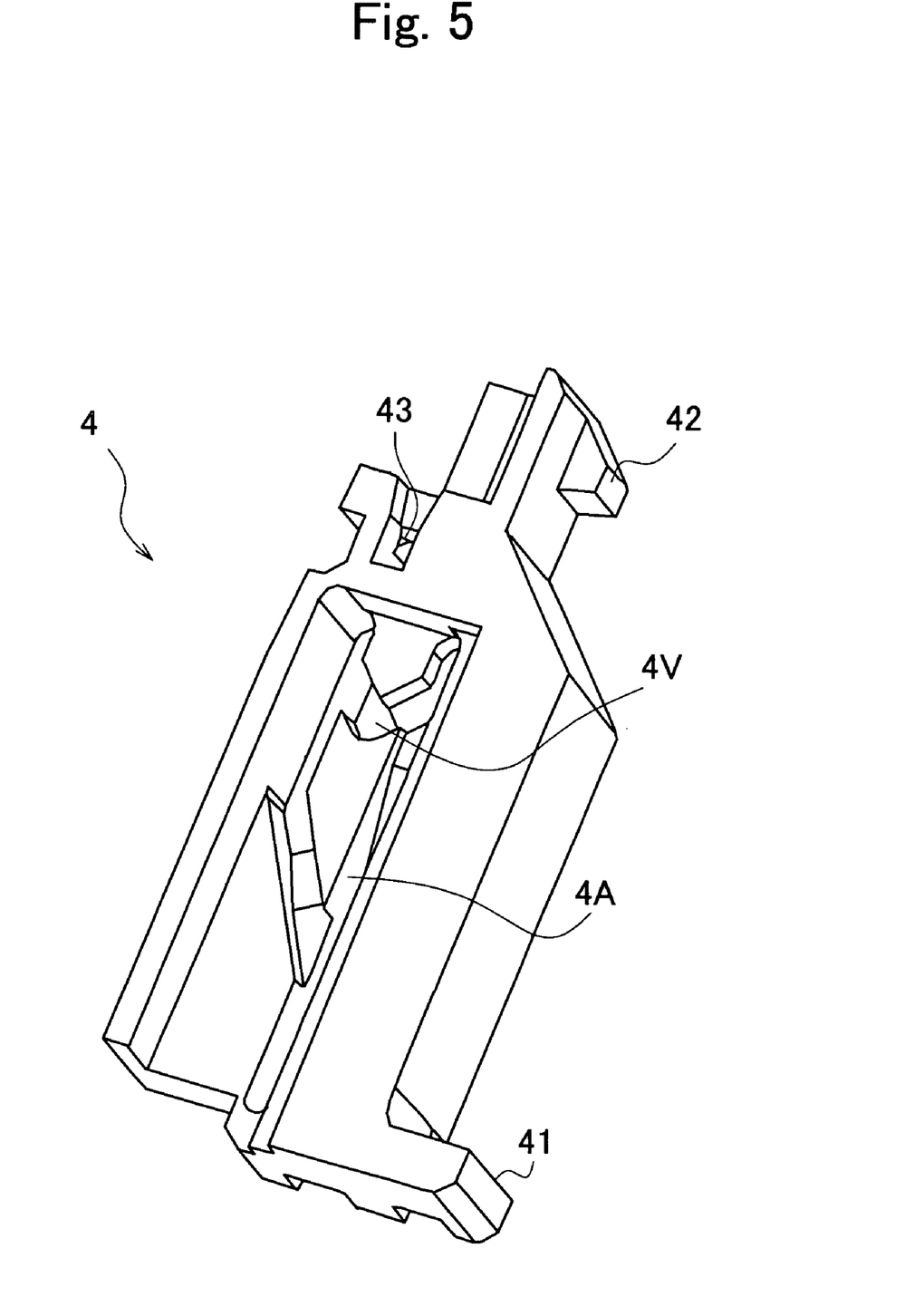
FIG. 5 is a perspective external view of a swing slider of the present invention viewed from the surface side thereof.

FIG. 5 is a perspective external view of the swing slider 4 viewed from the surface side thereof. As shown in FIG. 5, on the left side of the swing slider 4, the heart cam channel 4A is formed. The vertex of the cam groove 4A has a V-shaped groove 4V. Here, the bottom surface of the cam channel 4A is changed in level so that the guide rod 6 (refer to FIG. 2) does not trail in the reverse direction. The details thereof are left for later description.

From the right side surface of the swing slider 4, the first lug 41 is protruding. With the right side surface of the swing slider 4 and the first lug 41, an L-shaped latch groove is so formed as to match in shape with the corner part of the memory card 10 on the insertion side.

From the right upper side surface of the swing slider 4, the second lug 42 protrudes. To securely latch with the rectangular concave section 10A (refer to FIG. 2) on the memory card 10, one corner part of the second lug 42 is formed to have a 90-degree angle. The other corner part of the second lug 42 is sloped to facilitate the slide-coupling with the side surface of the memory card 10.

By referring to FIG. 5, the upper part of the swing slider 4 is formed with a stepped groove 43, which latches the hook of the tensile coil spring 5 of FIG. 2.

Figure 6:
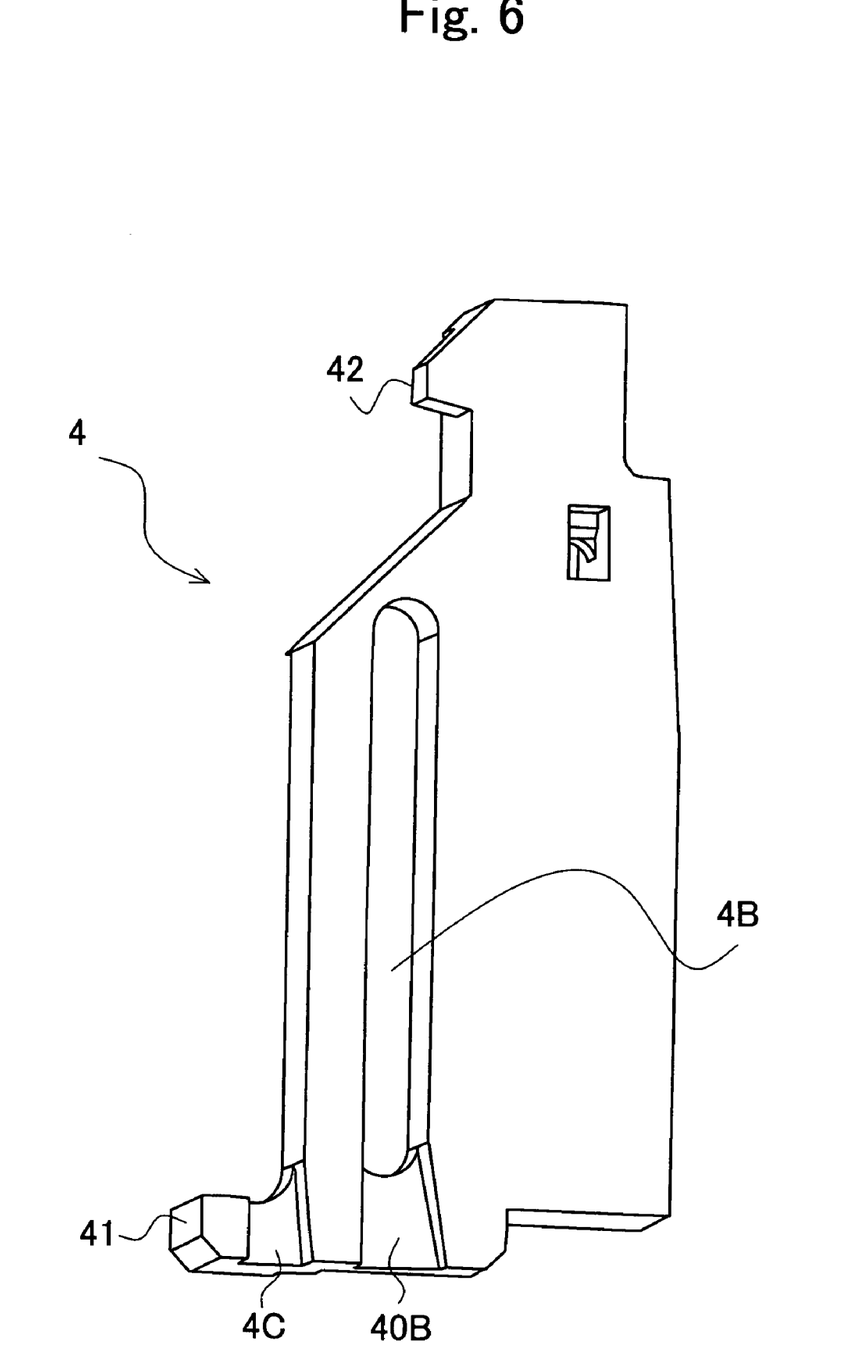
FIG. 6 is a perspective external view of the swing slider of the present invention viewed from the back side thereof.

FIG. 6 is a perspective external view of the swing slider 4 viewed from the back side thereof. As shown in FIG. 6, a countersunk long hole 4B is formed at the bottom surface of the swing slider 4. The countersunk long hole 4B is provided to guide the cylindrical protrusion 13A (refer to FIG. 4) formed to the first guide 13 (refer to FIG. 4). At the end part of the countersunk long hole 4B, a groove 40B is formed to slide-couple with the first guide 13. The groove 40B is open tapered toward its tail end.

By referring to FIG. 6, at the bottom surface of the swing slider 4, a concave section 4C is formed to slide-couple with the second guide 14 (refer to FIG. 4) to freely swing. The concave section 4C is also open tapered toward its tail end as is the groove 40B.

Figure 7:
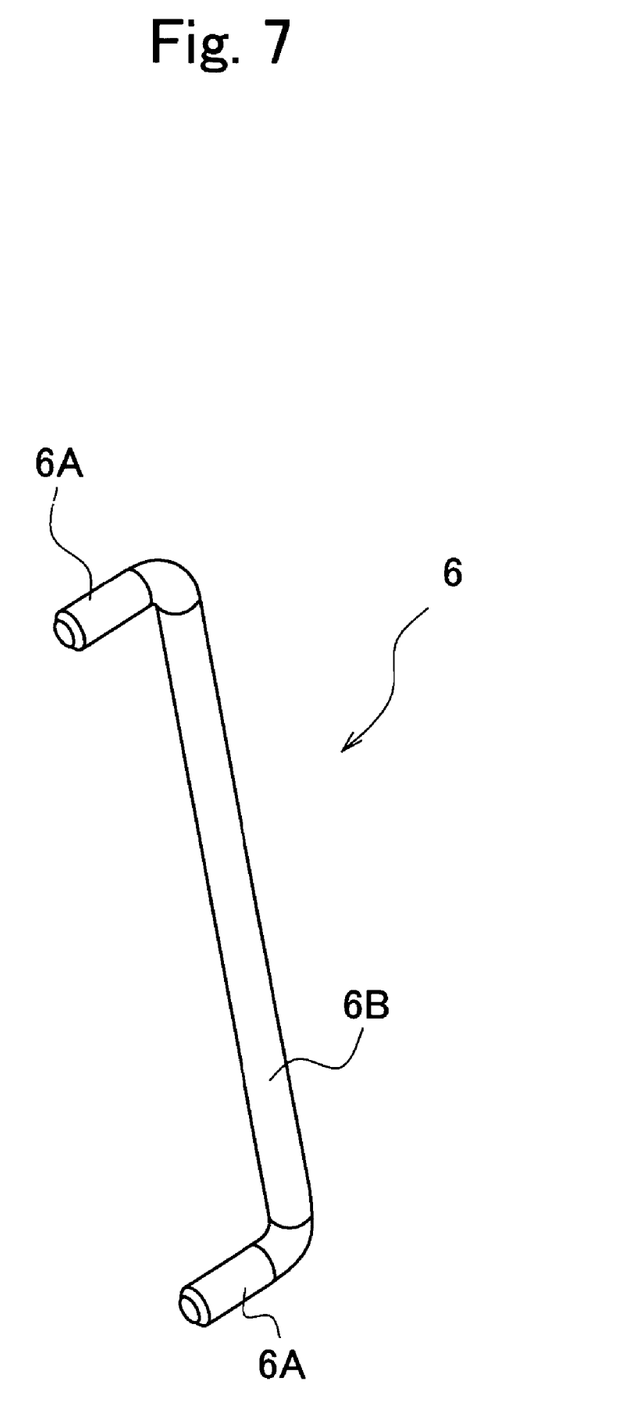
FIG. 7 is a perspective external view of a guide rod of the present invention.

FIG. 7 is a perspective external view of the guide rod 6. As shown in FIG. 7, the guide rod 6 has such a shape that both ends thereof are bent to each have a 90-degree angle. As such, the guide rod 6 has two bending shafts 6A and 6A, and one of the bending shafts 6A serves as a follower member of the heart cam channel 4A of FIG. 2, and the other bending shaft 6A is engaged with the shaft hole 14A of FIG. 4.

The guide rod 6 can freely swing about the shaft hole 14A, and a middle shaft section 6B thereof is pressed against the pressing piece 2C of FIG. 3.

The operation of attaching/detaching the memory card 10 to/from the connector 100, and the operation of the lock mechanism 1R are as will hereinafter be described in detail.

Figure 8:
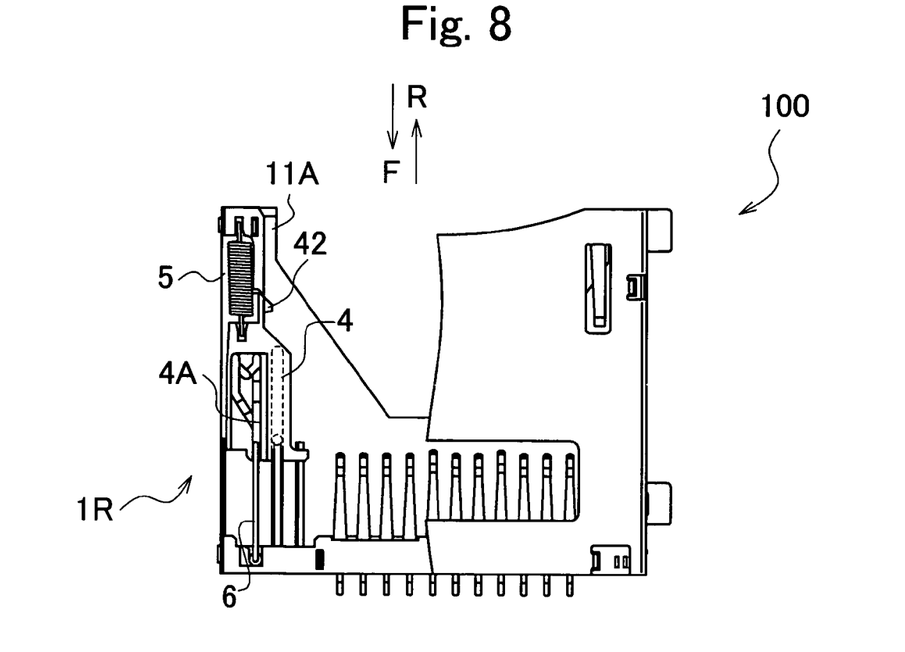
FIG. 8 is a plan view of the memory card connector of the present invention, showing the state before a memory card is inserted thereinto.

FIG. 8 is a plan view of the connector 100 before attached with the memory card 10. In FIG. 8, the swing slider 4 is biased by the tensile coil spring 5 in the direction of arrow R.

In FIG. 8, the swing slider 4 does not move any further in the direction of arrow R because the guide rod 6 is latched into the heart cam channel 4A. The second lug 42 of the swing slider 4 is so placed as to protrude from the guide wall 11A to abut the side surface of the memory card 10.

Figure 9:
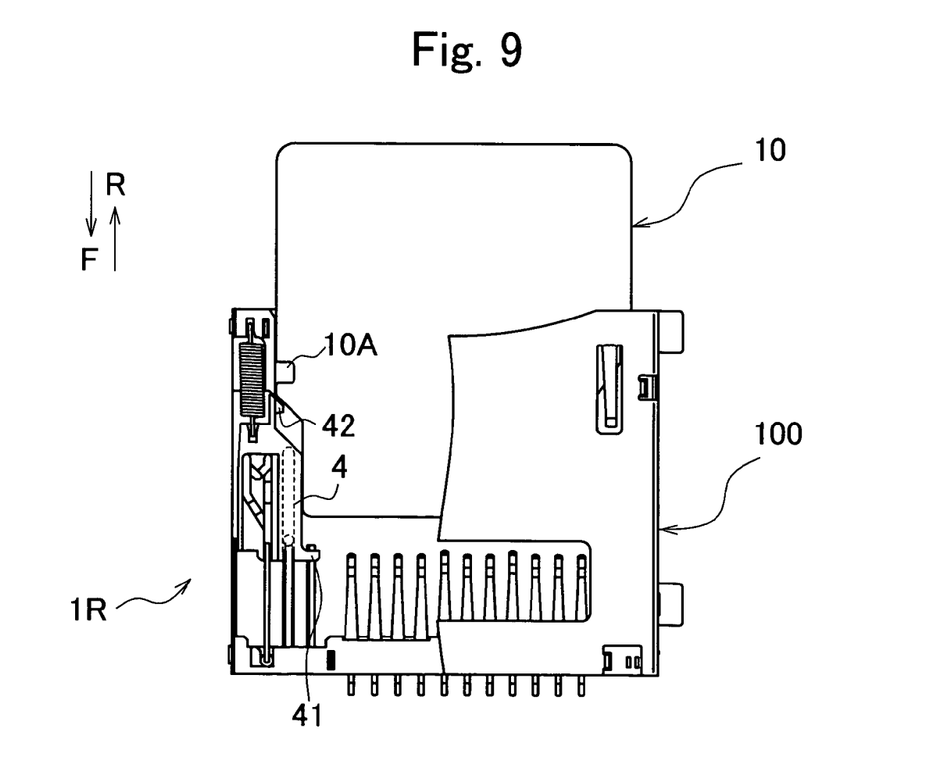
FIG. 9 is a plan view of the memory card connector of the present invention, showing the state after the memory card is inserted thereinto, and the slanting section of the side surface of the memory card is abutting a slope section of a second lug.

FIG. 9 is a view of the connector 100. FIG. 9 shows the state in which the memory card 10 is inserted into the connector 100, and the slanting section of the memory card 10 on its side surface is abutting the slope section of the second lug 42.

Under the state of FIG. 9, the corner part of the memory card 10 on the insertion side is not abutting the first lug 41.

Herein, the memory card 10 is inserted into the connector 100 in such a manner that the connector terminals come upside.

From the state of FIG. 9, when the memory card 10 is inserted a little in the direction of arrow F, the slanting section of the memory card 10 on its side surface slides over the slope section of the second lug 42. Thereafter, the connector 100 will be in the state of FIG. 10.

Figure 10:
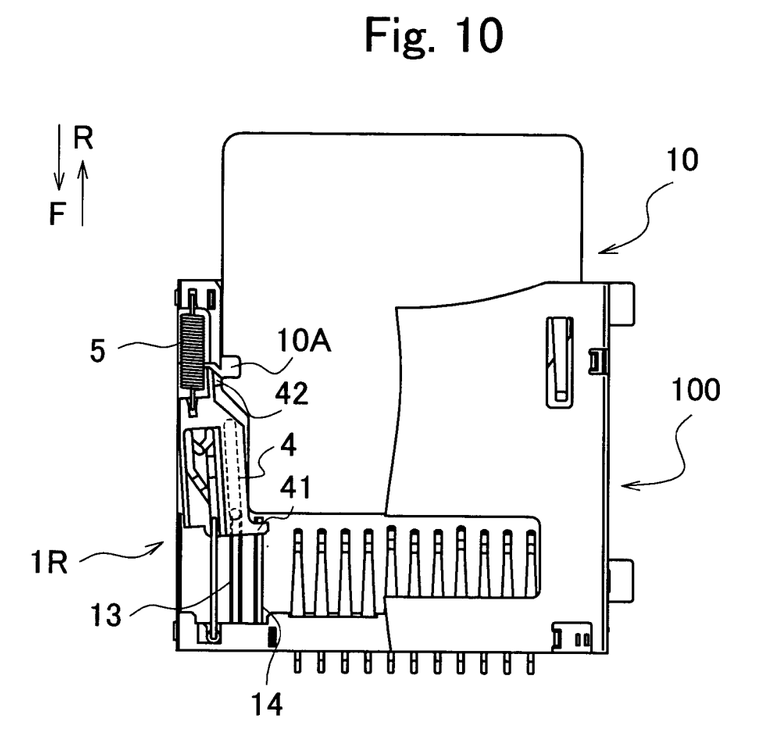
FIG. 10 is a plan view of the memory card connector of the present invention, showing the state that the side surface of the memory card is pushing up the second lug against the biasing force of a tensile coil spring.

FIG. 10 is a plan view of the connector 100. FIG. 10 shows the state in which the side surface of the memory card 10 is pushing up the second lug 42 against the biasing force of the tensile coil spring 5. In the process of state change from FIG. 9 to 10, the swing slider 4 is rotating counter clockwise about the cylindrical protrusion 13A (refer to FIG. 4) formed to the first guide 13.

Figure 11:
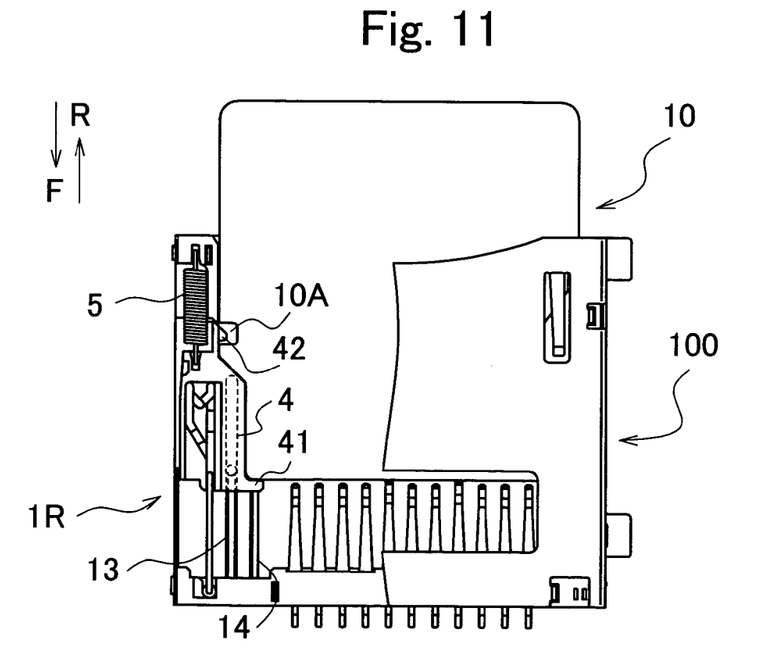
FIG. 11 is a plan view of the memory card connector of the present invention, showing the state that the second lug is engaged with the concave section.

From the state of FIG. 10, when the memory card 10 is inserted a little more into the direction of arrow F against the biasing force of the tensile coil spring 5, the connector 100 will be in the state of FIG. 11.

FIG. 11 is a plan view of the connector 100. In the process of state change from FIG. 10 to 11, the second lug 42 engages with the concave section 10A by sliding over the slanting section of the memory card 10 on its side surface. In FIG. 11, the corner part of the memory card 10 on the insertion side is abutting the first lug 41.

In the state of FIG. 11, the swing slider 4 rotates clockwise by the biasing force of the tensile coil spring 5, and returns to the same position and posture as FIG. 9. If the memory card 10 is inserted a little more in the direction of arrow F against the biasing force of the tensile coil spring 5, it will result in the insertion state of FIG. 12.

Figure 12:
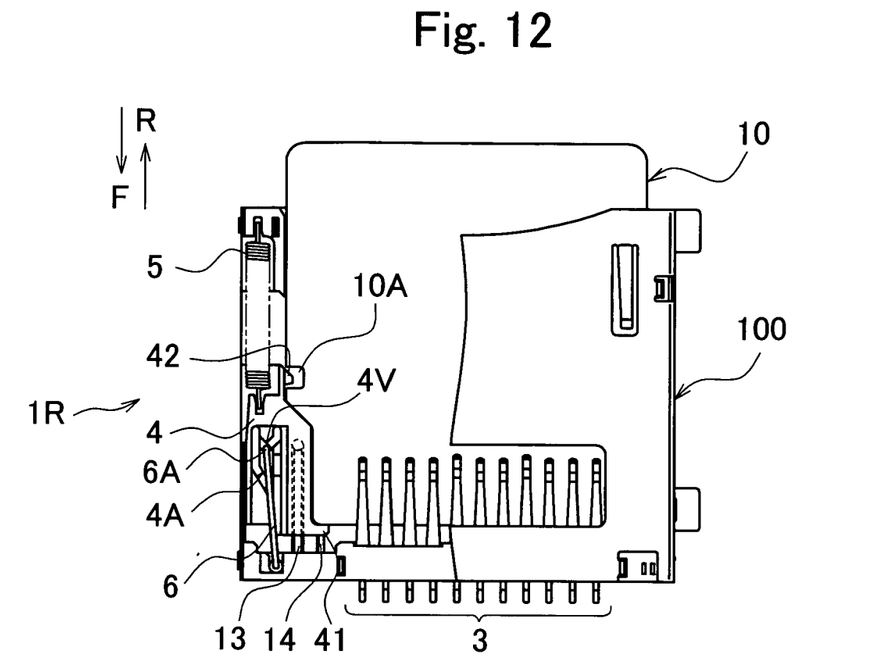
FIG. 12 is a plan view of the memory card connector of the present invention, showing the state that the memory card is inserted thereto.

FIG. 12 is a plan view of the connector 100. In the process of state change from FIG. 11 to 12, the swing slider 4 moves parallel following the first and second guides 13 and 14. Then, the swing slider 4 follows the movement of the memory card 10 to be inserted.

In FIG. 12, one bending shaft 6A of the guide rod 6 is moving toward the V-shaped groove 4V formed to the heart cam channel 4A. The swing slider 4 is biased to move in the direction of arrow R by the tensile coil spring 5. However, the swing slider 4 is fixed in position due to the guide rod 6 latched into the V-shaped groove 4V.

FIG. 12 shows the insertion state of the memory card 10. In this insertion state, the connector terminals on the memory card 10 are contacting with the cantilever contacts 3, thereby allowing data reading and writing from/to the memory card 10. The second lug 42 is engaging with the concave section 10A, and thus the memory card 10 is not easily popped out from the connector 100 even with vibration if occurred. With such a lock mechanism 1R of the present invention, the memory card 10 can favorably remain inserted.

From the state of FIG. 12, when the memory card 10 is inserted a little more in the direction of arrow F against the biasing force of the tensile coil spring 5, one bending shaft 6A of the guide rod 6 is released from the V-shaped groove 4V, and moves to the trail on the left side of the backward stroke.

Figure 13:
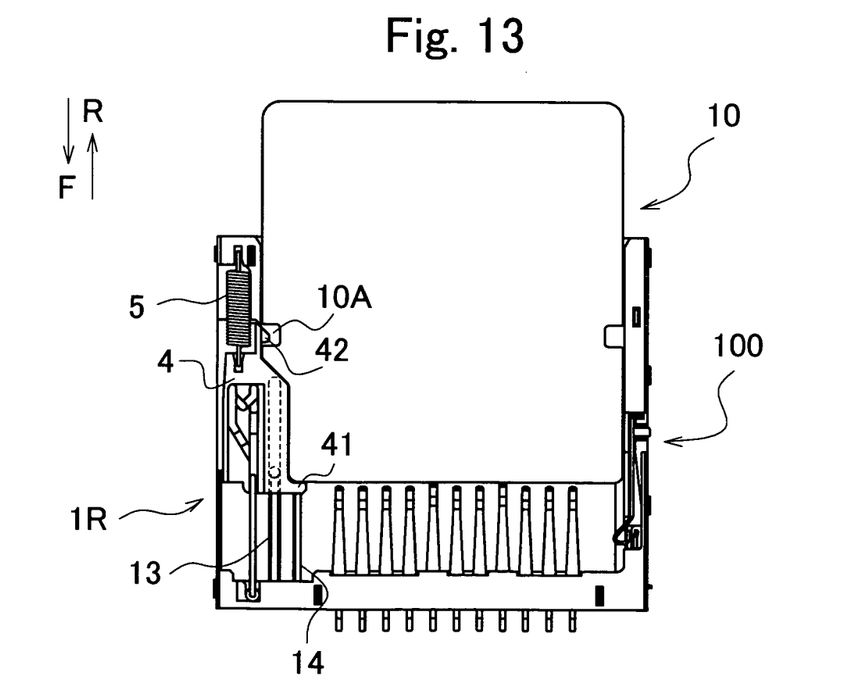
FIG. 13 is a plan view of the memory card connector of the present invention, showing the change from the state of FIG. 12.

Then, the memory card 10 moves in the direction of arrow R by the biasing force of the tensile coil spring 5, and is put into the state of FIG. 13. That is, by being pushed toward the first lug 41, the memory card 10 moves in the not-insertion direction, that is, in the ejection direction.

FIG. 13 is a plan view of the connector 100. In FIG. 13, the position relationship between the connector 100 and the memory card 10, and the state of the lock mechanism 1R are both put back to the same as those of FIG. 1. Even moved, the memory card 10 never accidentally pop out from the connector 100, because the second lug 42 remains engaged with the concave section 10 of the memory card 10.

As shown in FIG. 10, the second lug 42 biased by the tensile coil spring 5 pulls the card memory 10 with such a strong force as sliding over from the concave section 10A. Thus, after the state of FIG. 9, the memory card 10 can be ejected from the connector 10.

Figure 14A:
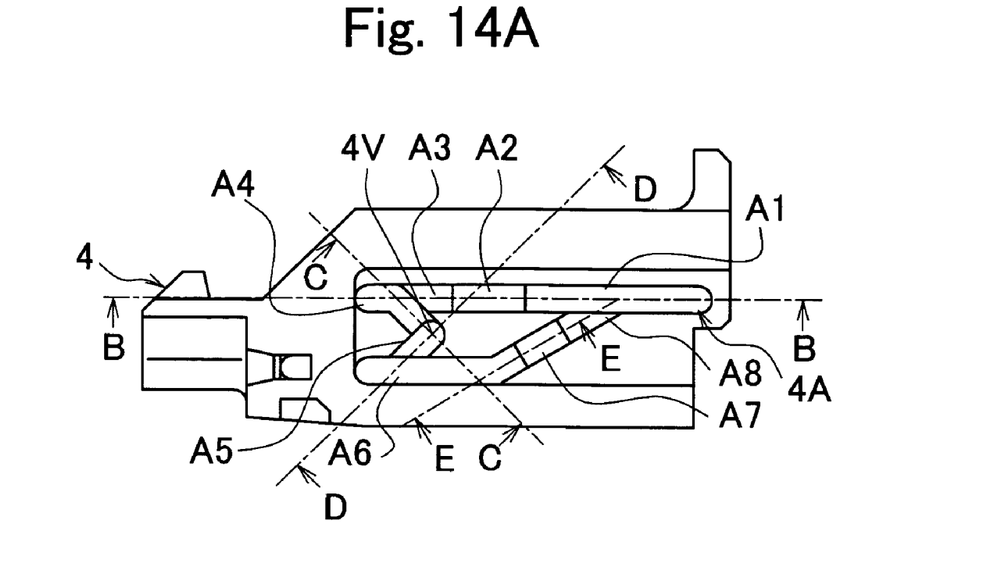
FIGS. 14A to 14E are all a diagram for illustrating the action of the swing slider of the present invention including a cam channel of a heart shape.
Figure 14B:
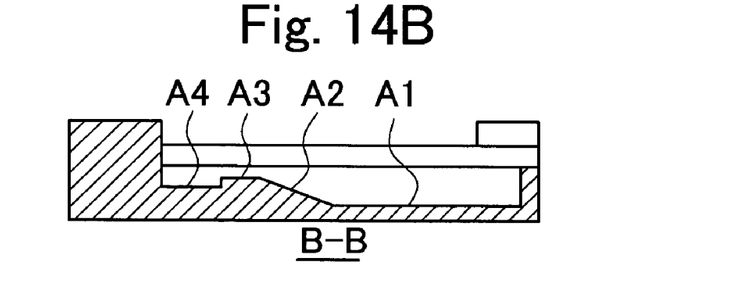
Figure 14C:
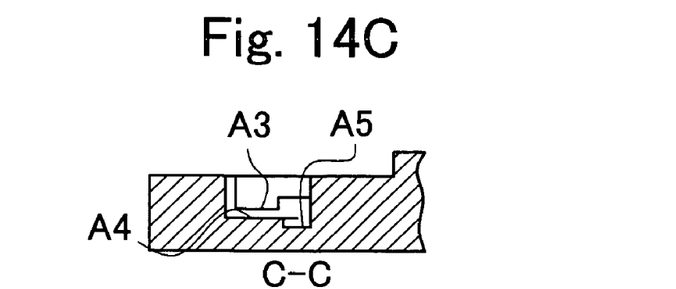
Figure 14D:
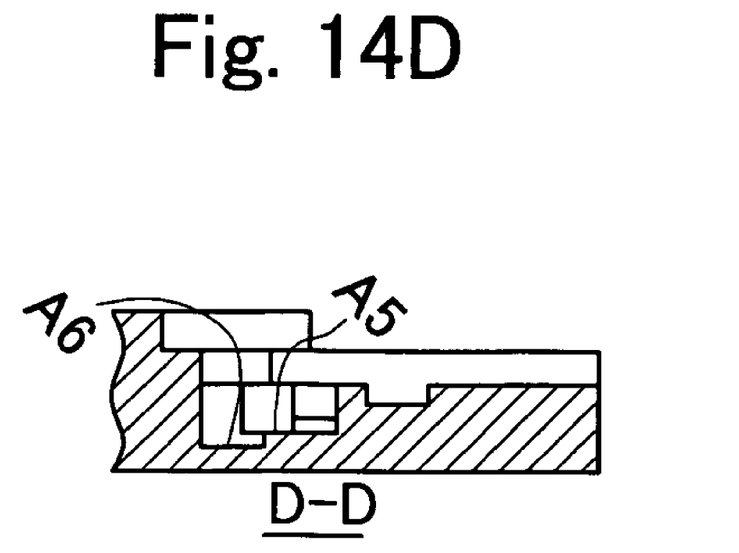
Figure 14E:
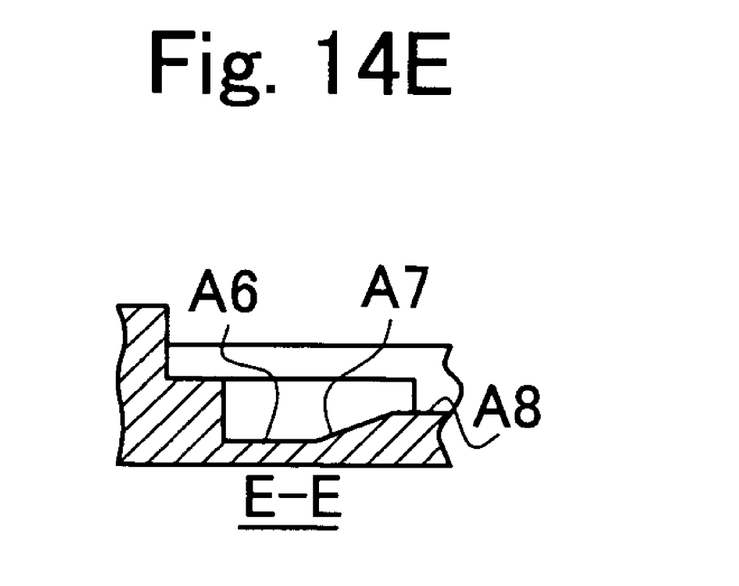

By referring to FIGS. 14A to 14E, described next is the action of the swing slider 4 including the heart cam channel 4A. Specifically, FIG. 14A is a plane view of the swing slider 4, and FIG. 14B is a cross sectional view cut along a B—B line of FIG. 14A. FIG. 14C is a cross sectional view cut along a C—C line of FIG. 14A. FIG. 14D is a cross sectional view cut along a D—D line of FIG. 14A. And FIG. 14E is a cross sectional view cut along an E—E line of FIG. 14A.

The cam system includes the swing slider 4 provided with the heart cam channel 4A as a cam serving as a moving member, and the guide rod 6 (refer to FIG. 2) as a follower member. The moving member and the follower member of the cam system relatively change in position.

In the present embodiment, the point where the swing slider 4 and the guide rod 6 are contacting will draw a plane curve, i.e., trail of heart. This contact point also draws a space curve of the continuous trail of the cam channel 4A whose bottom surface is changed in level or sloped. The swing slider 4 and the guide rod 6 are structuring a so-called three-dimensional cam system.

As shown in FIG. 14, from a bottom surface A1, the cam channel 4A starts to trail by the bending shaft 6A of the guide rod 6, and the bottom surface A1 is a plane parallel to the bottom surface of the swing slider 4. A bottom surface A2 is sloped upward from the bottom surface A1.

After the bending shaft 6A passes the sloped bottom surface A2, the bending shaft 6A reaches a bottom surface A3 locating upper than the bottom surface A1. After the bending shaft 6A passes the bottom surface A3, the plane is changed in level, and the bending shaft 6A reaches a bending bottom surface 4A locating lower than the bottom surface A3. That is, in the process of state change from FIG. 11 to 12, i.e., in the process that the bending shaft 6A (refer to FIG. 12) of the guide rod 6 moves, once reached the bottom surface A4, the bending shaft 6A cannot return therefrom to the bottom surface A3.

By referring to FIG. 14, after the bending shaft 6A passes the bottom surface A4, the plane is changed in level again, and the bending shaft 6A reaches a bottom surface A5 locating lower than the bottom surface A4. A groove formed to the bottom surface A4 and another groove formed to the bottom surface A5 form the V-shaped groove 4V.

In the process of state change from FIG. 11 to 12, i.e., in the process that the bending shaft 6A (refer to FIG. 11) of the guide rod 6 moves, once reached the bottom surface A5, the bending shaft 6A of the guide rod 6 is not allowed to return therefrom to the bottom surface A4. Once the bending shaft 6A reaches the V-shaped groove 4V, it will be locked or attached as shown in FIG. 12. Here, the trail of the bending shaft 6A from the bottom surface A1 to A5 may be referred to as "forward stroke".

Thereafter, as described by referring to FIG. 12, when the memory card 10 is inserted a little more in the direction of arrow F against the biasing force of the tensile coil spring 5, one bending shaft 6A of the guide rod 6 is released from the V-shaped groove 4V, and moves to the trail on the left side of the backward stroke.

By referring to FIG. 14, when the bending shaft 6A passes the bottom surface A5, the plane is changed in level, and the bending shaft 6A reaches a bottom surface A6 locating lower than the bottom surface A5. That is, in the trail of the backward stroke, after reaching the bottom surface A6, the bending shaft 6A (refer to FIG. 12) is not allowed to return therefrom to the bottom surface A5.

By referring to FIG. 14, adjacent to the bottom surface A6, formed is a bottom surface A7 that is sloped upward from the bottom surface A6. Once the bending shaft 6A passes the sloped bottom surface A7, the bending shaft 6A reaches a bottom surface A8 locating upper than the bottom surface A6. After the bending shaft 6A passes the bottom surface A8, the plane is changed in level, and the bending shaft 6A returns to the bottom surface A1 locating lower than the bottom surface A8.

As such, the contact point between the cam channel 4A and the guide rod 6 (refer to FIG. 2) draws a planar trail of a heart, and in the height direction, draws a trail partially irreversible.

According to the present invention, a second lug remains engaged with the concave section of the memory card, so that the second lug prevent a memory card from accidentally popping out from a connector on the way toward a card insertion port for ejection from the connector. With such a structure, the memory card can be ejected with reliability.

What is claimed is:

1. A connector comprising:
   a housing;
   a cover for covering the housing; and
   wherein the housing includes:
   a card retention section of substantially a box shape having a card insertion port for accepting therein a memory card,
   contacts which face the card insertion port to electrically contact with a distal end side of the memory card,
   a first guide having at a tip thereof a cylindrical protrusion in an opposing direction of the proximal end side of the housing, extending from the housing,
   a swing slider which is provided so as to freely swing in a direction substantially orthogonal to an insertion direction of the memory card, and engages at the same time with the distal end and a concave section on a side of the memory card to slide with the memory card in a port of the card retention section, wherein the swing slider comprises a countersunk long hole formed at the bottom surface of the swing slider for guiding the protrusion, the countersunk long hole is disposed along the longitudinal direction of the swing slider at the side which contacts with the memory card, the swing slider moves parallel to the insertion direction of the memory card by sliding the protrusion in the countersunk long hole, and
   a lock mechanism provided integrally with the swing slider for swinging the swing slider toward the inside to retain the memory card when the memory card reaches a proximal end side of the housing.

2. The connector according to claim 1, wherein the swing slider has a cam channel of a heart shape,
   wherein the lock mechanism includes a biasing member for biasing the swing slider toward inside of the card retention section and a guide rod engaged with the cam channel of the swing slider, and
   whereby the guide rod moves along the cam channel, and the swing slider is pulled by the biasing member and moves toward the card insertion port while engaging with the concave section and the distal end of the memory card when the memory card in a retained state is pushed in the insertion direction.

3. The connector according to claim 1 or 2, wherein the swing slider is provided with a first lug to be latched at the distal end of the memory card, and a second lug for engaging with the concave section of the memory card.

4. The connector according to claim 2, wherein a bottom surface of the cam channel is changed in level to prevent the guide rod from moving in a reverse direction, and
   wherein the cover includes a pressing piece for biasing the guide rod to the bottom surface of the cam channel.

5. The connector according to claim 1 or 2, wherein the memory card is a mini SD card.

* * * * *